United States Patent Office 3,499,012
Patented Mar. 3, 1970

3,499,012
$\Delta^{13(17)}$-FUSIDENE-21-OIC ACID DERIVATIVES AND INTERMEDIATES OBTAINED IN THE PRODUCTION THEREOF
Wagn Ole Godtfredsen, Vaerlose, and Welf von Daehne, Copenhagen, Denmark, assignors to Lovens Kemiske Fabrik Produktionsaktieselskab
No Drawing. Filed Sept. 27, 1967, Ser. No. 671,146
Claims priority, application Great Britain, Sept. 28, 1966, 43,429/66
Int. Cl. C07c *169/52*
U.S. Cl. 260—397.1                              13 Claims

ABSTRACT OF THE DISCLOSURE

The invention relates to novel antibiotics, which are derivatives of $\Delta^{13(17)}$-fusidene-21-oic acid and $\Delta^{13(17),20(22)}$-fusidadiene-21-oic acid, to methods of producing the said antibiotics from known antibiotics of the fusidic acid series, and to intermediates in the said production.

---

This invention relates to certain new antibiotics containing a cyclopentenoperhydrophenanthrene nucleus, to methods of producing them, and to intermediates for use in the said methods.

In particular, the invention relates to certain derivatives of $\Delta^{13(17)}$ - fusidene - 21 - oic acid and $\Delta^{13(17),20(22)}$-fusidadiene-21-oic acid.

According to the invention we provide new compounds having the following proposed Formulae I and II in which the stereochemistry at C-20 as yet has not been exactly established:

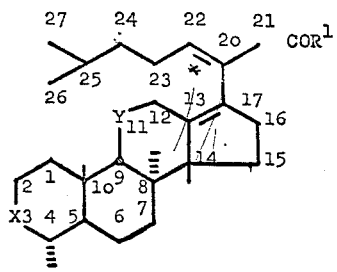

(I)

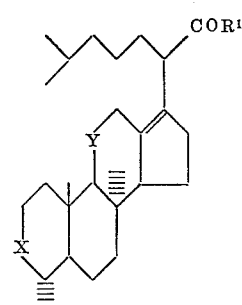

(II)

and in which X and Y each stand for

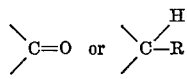

R representing an α- or β-hydroxy group, or a lower acyloxy group containing not more than 4 carbon atoms in a straight or branched carbon chain to which, moreover, a carboxyl, or a primary, secondary, or tertiary amino group may be attached; and in which $R^1$ represents a hydroxy group, or an alkoxy group containing not more than 4 carbon atoms in a straight or branched carbon chain to which, moreover, a carboxyl group or a primary, secondary, or tertiary amino group may be attached, the asterisk in Formula I denoting the fact that the formula represents the $C_{21}$–$C_{23}$ trans-form; and to salts of the compounds aforesaid with non-toxic pharmaceutically acceptable acids and bases.

The compounds of the invention can be derived from a known steroid antibiotic, namely fusidic acid, but differ from the latter both as regards structure and as regards activity. For example, experiments have shown that there is no cross-resistance between the compounds of the invention and fusidic acid, which is a highly remarkable feature.

Fusidic acid, previously designated Antibiotic ZN-6, and its production is described in the U.S. patent specification No. 3,072,531 which also illustrates the antibacterial spectrum of fusidic acid. Fusidic acid is used preferably in the treatment of staphylococcus infections, such as furunculosis, and is, inter alia, characteristic in that there is no cross-resistance between fusidic acid and the hitherto known antibiotics, whose effects fail if the infection is caused by pathogenic micro-organisms which have acquired resistance against the frequently used, known antibiotics.

Even if it has been possible in the laboratory to produce fusidic acid resistant strains of staphylococci, such strains are still very seldom encountered in practice, but the widespread and increasing use of fusidic acid must, of course, imply that the capacity of acquiring resistance is a factor which must be taken into consideration.

As an example of another steroid antibiotic derived from fusidic acid mention may be made of 24,25-dihydrofusidic acid which has been described in the U.S. patent specification No. 3,334,014, which also discloses its production.

In dihydrofusidic acid, the isolated double bond of fusidic acid has been hydrogenated resulting in a greater chemical stability and in toxicological and microbiological changes, but above all it has been found that there is cross-resistance between fusidic acid and dihydrofusidic acid, indicating a relatively close analogy in the mechanism of action of the compounds in contradistinction to what is the case with fusidic acid and the compounds of the present invention.

The latter interesting feature is described in greater detail in the following Table I, where the activity of the compound 3α,11α - dihydroxy - $\Delta^{13(17),20(22)}$-fusidadiene-21-oic acid, hereinafter called A, and of the compound 3α,11α-dihydroxy-$\Delta^{13(17)}$-fusidene-21-oic acid, hereinafter called B, is compared with the activity of fusidic acid, hereinafter called F, against a number of micro-organisms. The activity ($IC_{50}$) is expressed as the amount of the antibiotic in question in mg. per litre which causes 50 percent inhibition of the organism in question.

TABLE I

|  | F | A | B |
|---|---|---|---|
| Corynebacterium diphtheriae gravis | 0.01 | 1.2 | 1.2 |
| Corynebacterium xerosis | 0.006 | 1.2 | 1.2 |
| Sarcina lutea | 0.1 | 1.6 | 1.6 |
| Bacillus subtilis | 0.3 | 0.4 | 0.6 |
| Staph. aureus (fusidic acid sensitive strain) | 0.05 | 1.6 | 1.6 |
| Staph. aureus (fusidic acid resistant strain) | 190 | 1.6 | 1.6 |
| Streptococcus faecalis | 5 | 1.6 | |
| Strepococcus pyogenes | 2 | 20 | |
| Diplococcus pneumoniae, type 1 | 2 | 50 | |
| Diplococcus pneumoniae, type 3 | 10 | 80 | |
| Neisseria gonorrhoeae | 1.6 | >100 | |
| Haemophilus influenzae | 50 | >100 | |
| Bordetella pertussis | 0.1 | >100 | |

Further microbiological investigations have moreover shown other differences in the mechanism of action of the compounds, e.g. that the compounds A and B have essentially a bactericidal effect which, as is well known, is a particularly advantageous property of an antibiotic, whereas fusidic acid and many other known antibiotics, such as the tetracyclines, are primarily bacteriostatic compounds. It has also been found that the effect of the compounds of the invention is independent of the size or concentration of the inoculum of test organisms in contrast with many antibiotics.

The compounds according to the invention are not merely intended to be used as substitutes for fusidic acid or 24,25-dihydrofusidic acid in cases where the infectious disease is caused by micro-organisms which have acquired resistance to the latter antibiotics, but are also intended to be used in the form of combination preparations containing fusidic acid, or 24,25-dihydrofusidic acid, or other antibiotics, and one or more of the compounds according to the invention.

If $R^1$ in Formulae I and II represents a hydroxy group, the compounds are weak acids which may be used as such for pharmaceutical purposes, but which are preferably used in the form of their salts with non-toxic pharmaceutical bases.

With a view to the form of application, adequate resorbability, distribution in the organism, and the like factors, it is proposed according to the invention to introduce amino groups or carboxylic groups as substituents in alcohols with which the carboxylic group at $C_{20}$ may be esterified, or in acids with which the hydroxy groups at $C_3$ and $C_{11}$ may be esterified. From such derivatives containing relatively strong carboxyl or amino groups it is possible with bases and acids, respectively, to produce salts with pharmaceutically and pharmacologically advantageous properties.

The method of the invention comprises the isomerization of a compound of the following formula

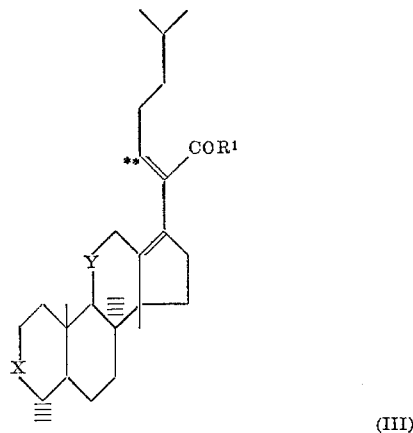

(III)

in which X, Y, R, and $R^1$ have the meaning hereinbefore defined, and in which the double asterisk indicates a $C_{21}$–$C_{23}$ cis-form, whereby a compound of Formula I in the trans-form is obtained, which by a subsequently performed hydrogenation may be converted into the corresponding compound of Formula II, or by hydrogenation of a compound of Formula III a corresponding compound of Formula II will be directly provided; in the compound of Formula I or II thus obtained the free carboxylic acid group attached to $C_{20}$ may subsequently be esterified, or, if the said group is in the ester-form, it may be saponified; one or both of the hydroxy groups in the 3- and 11-position may be acylated, or, if acylated, they may be saponified, and, furthermore, one or both of the hydroxy groups in the 3- and 11-position may be converted into a keto group or keto groups, which, if desired, subsequently is or are reduced to a hydroxy group or groups in the α- or β-position in a manner known per se.

The isomerization can be effected by means of a number of reactions known in the art. In a preferred embodiment of the invention, however, a compound is used as starting substance in which the carboxylic acid group attached to $C_{20}$ is esterified. The isomerization will then proceed readily when the ester is exposed to alkaline conditions.

The reaction may be carried out in dilute solution, for instance by dissolving the starting substance in a suitable solvent, such as methanol or ethanol, or a mixture of solvents such as acetone/water, to which is added a suitable base such as sodium hydroxide, or a weaker base such as ammonia, or an organic base, whereafter the reaction mixture is left standing at a suitable temperature for at least the period of time required to accomplish the isomerization.

Although the isomerization may proceed rather fast, it may be appropriate in certain cases to carry out the reaction during a considerably longer period of time, owing to the fact that a saponification of the ester group may occur simultaneously to a more or less degree, and consequently, it can be desirable to complete the saponification in order to obtain a well defined reaction product.

The addition of hydrogen to the $\Delta^{20(22)}$ double bond is performed by a hydrogenation in the presence of a catalyst, preferably a noble metal catalyst, such at Pt, Pd, or Ru, or a modified noble metal catalyst. Furthermore Raney-Ni is suitable as a catalyst.

According to the invention, and if desired, the compound obtained by the isomerization and/or hydrogenation may be subjected to an oxidation to convert one or both of the hydroxy groups in the 3- and 11-position into keto groups of which one or both subsequently may be reduced to hydroxy groups, in the α- or β-position.

Alternatively, a keto group or keto groups present in the 3- and 11-positions may directly be reduced to a hydroxy group or hydroxy groups in the α- or β-position, if desired selectively, by temporary protection of one of the keto groups.

These steps are more fully described in the U.S. patent specification No. 3,230,240.

The esterification of a free carboxylic acid group attached to $C_{20}$, and the acylation of a hydroxy group or hydroxy groups in the 3- and/or 11-positions may be performed in arbitrary order and in a manner known per se.

The starting substances of Formula III are 3- and/or 11-substituted $\Delta^{13(17),20(22)}$-fusidadiene-21-oic acids in the $C_{21}$–$C_{23}$ cis-form. They are hitherto unknown compounds which, in addition to their use as starting substances in the method of the invention, may be of interest by virtue of their antibacterial effect which, however, is considerably lower than that of the compounds of Formulae I and II.

The starting substances of Formula III can be prepared from 24,25-dihydrofusidic acid and certain of its derivatives, these compounds having the formula

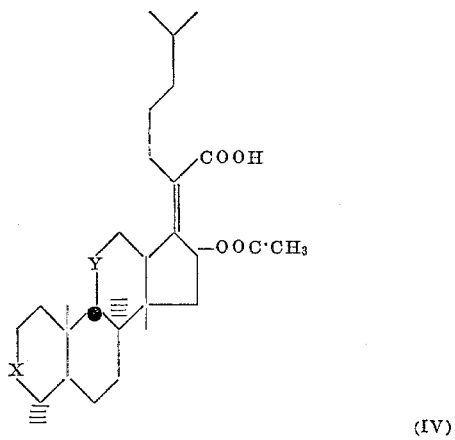

(IV)

in which X, Y, and R have the meaning hereinbefore defined.

By heating a compound of Formula IV, or a salt thereof, acetic acid is eliminated under the formation of the corresponding compound of Formula III.

The heating may be performed in the presence of a medium with a high boiling point, preferably a polar medium, such as dimethylformamide, dimethyl sulphoxide, or collidine, and furthermore it has been found that the elimination of acetic acid is facilitated by the presence of lithium chloride.

The preparation of 24,25-dihydrofusidic acid and its derivatives of Formula IV has been described in U.S. patent specifications Nos. 3,334,014 and 3,230,240, respectively.

The starting substances of Formula III may conveniently be prepared in accordance with the procedures described below.

Preparation of the $C_{21}$–$C_{23}$ cis-form of $3\alpha,11\alpha$-dihydroxy-$\Delta^{13(17),20(22)}$-fusidadiene-21-oic acid A mixture of the sodium salt of 24,25-dihydrofusidic acid (44 g.), lithium chloride (88 g.), and anhydrous dimethylformamide (380 ml.) was heated to 135–140° C. for 2½ hours. After cooling, the mixture was poured into water (approximately 1 litre) whereupon the resulting amorphous precipitate was filtered off and washed with water. It was then dissolved in ether (250 ml.), and the ethereal solution was shaken vigorously with 50 ml. of 2 N NaOH. The precipitate thus formed was filtered off and washed with water and acetone followed by ether. Thereby 22 g. of the crystalline sodium salt of $3\alpha,11\alpha$-dihydroxy-$\Delta^{13(17),20(22)}$-fusidadiene-21-oic acid ($C_{21}$–$C_{23}$ cis-form) were obtained.

The corresponding acid was obtained by neutralization of a methanolic solution of the sodium salt followed by precipitation from water. This acid, after recrystallization from methanol/water, had a melting point of 181–182° C.

$[\alpha]_D^{20}$ —90°, $\lambda_{max.}^{EtOH}$ = 209 m$\mu$ ($\epsilon$ 12,600) and 252 m$\mu$ ($\epsilon$ 7750)

The corresponding methyl ester was obtained by treatment of an ethereal solution of the acid with diazomethane. Melting point 129–130° C.

$[\alpha]_D^{20}$ —77°, $\lambda_{max.}^{EtOH}$ = 209 m$\mu$ ($\epsilon$ 13,200) and 252 m$\mu$ ($\epsilon$ 6600)

Preparation of the $C_{21}$–$C_{23}$ cis-form of 3-keto-11$\alpha$-hydroxy-$\Delta^{13(17),20(22)}$-fusidadiene-21-oic acid A mixture of the known 3-keto-24,25-dihydrofusidic acid (20 g.), lithium chloride (40 g.) and anhydrous dimethylformamide (200 ml.) was heated to 135–140° C. for 1½ hours with stirring. After cooling to ca. 100° C. the mixture was poured into water (1 litre), and the amorphous precipitate thus formed was filtered off and washed with water. It was then dissolved in ether (200 ml.), and the acidic compounds of the reaction mixture were extracted with 1 N NaOH (2×60 ml.). The combined basic extracts were acidified with 4 N hydrochloric acid, the resulting oily precipitate being extracted with ether (2×100 ml.), and the ethereal extract being washed with water, dried, and evaporated to dryness in vacuo. The resulting residue (16 g.) was chromatographed on a column of silica gel (320 g.). The column was eluted with methylene chloride containing increasing amounts of methanol. The fractions which, according to thin-layer chromatography, contained the desired compound were combined and evaporated to yield 4 g. of an amorphous residue. Rechromatography of this residue on silica gel in the described manner gave the pure 3-keto-11$\alpha$-hydroxy-$\Delta^{13(17),20(22)}$-fusidadiene-21-oic acid ($C_{21}$–$C_{23}$ cis-form)

$\lambda_{max.}^{EtOH}$ = 207 m$\mu$ ($\epsilon$ 11,200)

The corresponding methyl ester was obtained by treatment of an ethereal solution of the acid with diazomethane as a viscous oil $\lambda_{max.}^{EtOH}$ = 207 m$\mu$ ($\epsilon$ 12,200) and 252 m$\mu$ ($\epsilon$ 6200)

The invention will now be illustrated by the following non-limiting examples from which details of the various embodiments will be apparent.

Example I.—$3\alpha,11\alpha$-dihydroxy-$\Delta^{13(17),20(22)}$-fusidadiene-21-oic acid ($C_{21}$–$C_{23}$ trans-form)

4 g. of the methyl ester of $3\alpha,11\alpha$-dihydroxy-$\Delta^{13(17),20(22)}$-fusidadiene-21-oic acid ($C_{21}$–$C_{23}$ cis-form) were dissolved in 40 ml. of 5% methanolic potassium hydroxide. The solution was refluxed for 4 hours, and, after cooling, the mixture was poured into ice-water (200 ml.). After extraction with ether, the solution was acidified with 4 N hydrochloric acid and extracted with ether. The ethereal extract was washed with water until the washings became neutral whereupon the extract was dried and evaporated in vacuo. The residue (2.8 g.) was recrystallized from ether to yield 1.8 g., melting point 188–190° C. Recrystallization from ether raised the melting point to 192–194° C.

$[\alpha]_D^{20}$ —82°, $\lambda_{max.}^{EtOH}$ = 209 m$\mu$ ($\epsilon$ 18,800)

Analysis.—Calculated for $C_{29}H_{46}O_4$ (percent): C, 75.94; H, 10.11. Found (percent): C, 75.71; H, 10.03.

Example II.—$3\alpha,11\alpha$-dihydroxy-$\Delta^{13(17)}$-fusidene-21-oic acid 400 mg. of $3\alpha,11\alpha$-$\Delta^{13(17),20(22)}$-fusidadiene-21-oic acid ($C_{21}$–$C_{23}$ cis-form) were dissolved in ethanol (16 ml.) and hydrogenated over 10% Pd/CaCO$_3$ (200 mg.) at room temperature and atmospheric pressure. After the consumption of 38 ml. of hydrogen, the hydrogenation came to a stop. The catalyst was filtered off and the filtrate evaporated in vacuo to dryness. The evaporation residue crystallized from methanol/acetonitrile and yielded crystals with melting point 173–174° C., $[\alpha]_D^{20}$ —184°, $\lambda_{max.}^{EtOH}$ = 204 m$\mu$ ($\epsilon$ 8100)

Analysis.—Calculated for $C_{29}H_{48}O_4$ (percent): C, 75.60; H, 10.50. Found (percent): C, 75.30; H, 10.25.

Example III.—$3\alpha,11\alpha$-dihydroxy-$\Delta^{13(17)}$-fusidene-21-oic acid 400 mg. of the $3\alpha,11\alpha$-dihydroxy-$\Delta^{13(17),20(22)}$-fusidadiene-21-oic acid ($C_{21}$–$C_{23}$ trans-form) prepared as described in Example I were dissolved in ethanol (16 ml.) and hydrogenated over 10% Pd/CaCO$_3$ (200 mg.) at atmospheric pressure and room temperature. After the consumption of 40 ml. of hydrogen, the hydrogenation came to a stop. The catalyst was filtered off and the filtrate evaporated in vacuo to dryness. The evaporation residue crystallized from methanol/acetonitrile, yielding colourless crystals with melting point 173–174° C., identical in every respect with the product described in Example II.

Example IV.—$3\alpha$-acetoxy-11$\alpha$-hydroxy-$\Delta^{13(17),20(22)}$-fusidadiene-21-oic acid ($C_{21}$–$C_{23}$ trans-form)

To a solution of $3\alpha,11\alpha$-dihydroxy-$\Delta^{13(17),20(22)}$-fusidadiene-21-oic acid in the $C_{21}$–$C_{23}$ trans-form (2 g.) in dry pyridine (8 ml.) acetic anhydride (2 ml.) was added. After standing at room temperature for 16 hours the mixture was poured into ice-water and the precipitate thus formed extracted with ether. The ethereal extract was washed with dilute hydrochloric acid and water, dried, and evaporated in vacuo. The resulting amorphous residue (2 g.) was crystallized from acetonitrile to yield 1.4 g. of the desired compound, melting point 123–124° C. Recrystallization from ether/acetonitrile raised the melting point to 125–126° C., $[\alpha]_D^{20}$ —66°, $\lambda_{max.}^{EtOH}$ = 209 m$\mu$ ($\epsilon$ 19250)

The IC$_{50}$ of this compound against Staph. aureus was determined to be 1.6 $\mu$g./ml.

Example V.—$3\alpha$-acetoxy-11$\alpha$-hydroxy-$\Delta^{13(17)}$-fusidene-21-oic acid A solution of $3\alpha$-acetoxy-11$\alpha$-hydroxy-$\Delta^{13(17),20(22)}$-fusidadiene-21-oic acid in the $C_{21}$–$C_{23}$ trans-form (0.4 g.)

in ethanol (20 ml.) was hydrogenated over 10% Pd/CaCO₃ (100 mg.) at atmospheric pressure and room temperature. After consumption of 44 ml. of hydrogen the hydrogenation came to a stop, and the catalyst was removed by filtration. The filtrate was evaporated in vacuo to yield 0.4 g. of the desired compound as a colourless amorphous residue, $[\alpha]_D^{20} -149°$, $\lambda_{max.}^{EtOH} = 204$ m$\mu$ ($\epsilon$ 7250)

The IC₅₀ of this compound against *Staph. aureus* was determined to be 1.6 μg./ml.

Example VI.—3-keto-11α-hydroxy-Δ¹³⁽¹⁷⁾,²⁰⁽²²⁾-fusidadiene-21-oic acid (C₂₁–C₂₃ trans-form)

1.38 g. of the methyl ester of 3-keto-11α-hydroxy-Δ¹³⁽¹⁷⁾,²⁰⁽²²⁾-fusidadiene-21-oic acid (C₂₁–C₂₃ cis-form) were dissolved in 20 ml. of 5% methanolic potassium hydroxide, and the solution was refluxed for 4 hours. After cooling, the mixture was poured into water, extracted with ether, and the aqueous layer acidified with 4 N hydrochloric acid. The resulting precipitate was extracted with ether, and the extract was washed with water, dried, and evaporated in vacuo. The residue (1.20 g.) was chromatographed on silica gel (48 g.). The fractions which, according to thin-layer chromatography, contained the desired compound were collected and evaporated to yield 0.58 g. of amorphous material, $\lambda_{max.}^{EtOH} = 208$ m$\mu$ ($\epsilon$ 16200)

The IC₅₀ of this compound against *Staph. aureus* was determined to be 5 μg./ml.

Example VII.—3-keto-11α-hydroxy-Δ¹³⁽¹⁷⁾-fusidene-21-oic acid

A solution of 3-keto-11α-hydroxy-Δ¹³⁽¹⁷⁾,²⁰⁽²²⁾-fusidadiene-21-oic acid in the C₂₁–C₂₃ cis-form (0.56 g.) in ethanol (20 ml.) was hydrogenated over 10% Pd/CaCO₃ (0.28 g.) at atmospheric pressure and room temperature. The hydrogenation stopped after the consumption of 62 ml. of hydrogen. The catalyst was filtered off and the filtrate was evaporated to dryness in vacuo, yielding the desired compound as a colourless amorphous residue, $\lambda_{max.}^{EtOH} = 204$ m$\mu$ ($\epsilon$ 7000)

The IC₅₀ of this compound against *Staph. aureus* was determined to be 5 μg./ml.

Example VIII.—3β,11α-dihydroxy-Δ¹³⁽¹⁷⁾,²⁰⁽²²⁾-fusidadiene-21-oic acid (C₂₁–C₂₃ trans-form)

To a stirred solution of 3-keto-11α-hydroxy-Δ¹³⁽¹⁷⁾,²⁰⁽²²⁾-fusidadiene-21-oic acid in the C₂₁–C₂₃ trans-form (0.30 g.) in methanol (10 ml.), sodium borohydride (0.30 g.) was added in small portions during 10 minutes. During the addition, the temperature was kept below 5° C. by cooling with ice-water. After standing for 30 minutes the mixture was neutralized with acetic acid, poured into water, and the resulting precipitate extracted with ether. The extract was carefully washed with water, dried, and evaporated to dryness in vacuo. The desired compound was obtained as an amorphous substance (0.26 g.), $\lambda_{max.}^{EtOH} = 208$ m$\mu$ ($\epsilon$ 16500)

The IC₅₀ of this compound against *Staph. aureus* was determined to be 5 μg./ml.

Example IX.—The diethylaminoethyl ester of 3α,11α-dihydroxy-Δ¹³⁽¹⁷⁾-fusidene-21-oic acid A mixture of the potassium salt of 3α,11α-dihydroxy-Δ¹³⁽¹⁷⁾-fusidene-21-oic acid (250 mg.) and diethylaminoethyl chloride (0.75 ml.) was refluxed for 16 hours in a mixture of acetone (10 ml.) and water (0.1 ml.). After cooling, the potassium chloride, formed during the reaction, was filtered off and excess of 4 N ethanolic hydrogen chloride was added to the filtrate. The crystalline hydrochloride of the desired compound, which precipitated, was filtered off, washed with acetone, and dried to yield 250 mg., melting point 237.5–238.5° C. Recrystallization from anhydrous ethanol raised the melting point to 239.5–240° C.

The IC₅₀ of this compound against *Staph. aureus* was determined to be 1.6 μg./ml.

We claim:
1. Compounds and pharmaceutically acceptable salts thereof of the formula

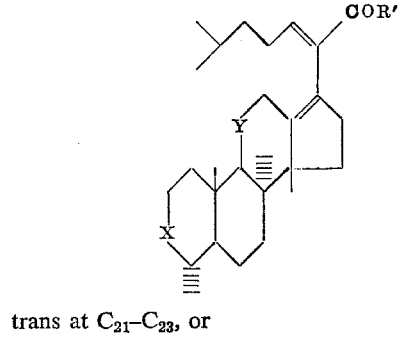

trans at C₂₁–C₂₃, or

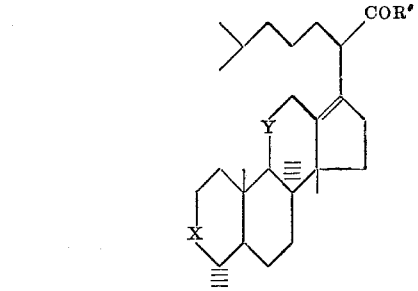

wherein

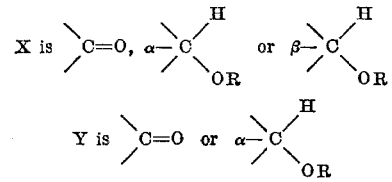

R is hydrogen or acyl having a chain length of 1–4 carbon atoms; and R' is hydroxy or alkoxy having a chain length of 1–4 carbon atoms.

2. Compounds according to claim 1 wherein X and Y are

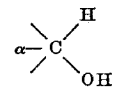

3. Compounds according to claim 1 wherein

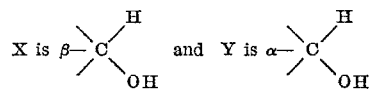

4. Compounds according to claim 1 wherein

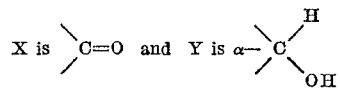

5. 3α,11α-dihydroxy-Δ¹³⁽¹⁷⁾-fusidene-21-oic acid.
6. 3α-acetoxy-11α-hydroxy-Δ¹³⁽¹⁷⁾-fusidene-21-oic acid.
7. 3-keto-11α-hydroxy-Δ¹³⁽¹⁷⁾-fusidene-21-oic acid.
8. 3α,11α - dihydroxy - Δ¹³⁽¹⁷⁾,²⁰⁽²²⁾-fusidadiene-21-oic acid C₂₁–C₂₃ trans-form.
9. 3β,11α - dihydroxy - Δ¹³⁽¹⁷⁾,²⁰⁽²²⁾-fusidadiene-21-oic acid C₂₁–C₂₃ trans-form.
10. 3α - acetoxy-11α-hydroxy-Δ¹³⁽¹⁷⁾,²⁰⁽²²⁾-fusidadiene-21-oic acid C₂₁–C₂₃ trans-form.
11. 3-keto-11α-hydroxy-Δ¹³⁽¹⁷⁾,²⁰⁽²²⁾-fusidadiene-21 - oic acid C₂₁–C₂₃ trans-form.
12. 3α,11α - dihydroxy-Δ¹³⁽¹⁷⁾-fusidene-21-oic acid, diethylaminoethyl ester.

13. Compounds of the formula
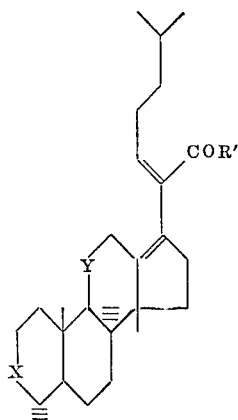
cis at $C_{21}$–$C_{23}$ wherein X is
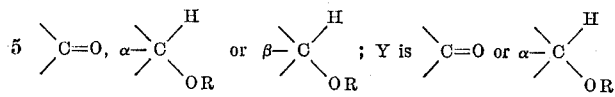
R is hydrogen or acyl having a chain length of 1–4 carbon atoms; and R' is hydroxy or alkoxy having a chain length of 1–4 carbon atoms.
References Cited
UNITED STATES PATENTS
3,375,165  3/1968  Hagemann et al. _____ 167—65
ELBERT L. ROBERTS, Primary Examiner